United States Patent [19]

Nagel et al.

[11] Patent Number: 4,583,761

[45] Date of Patent: Apr. 22, 1986

[54] FRAMES FOR SCOOP LOADERS, FORK LIFTS AND THE LIKE

[75] Inventors: Dieter Nagel, Grosswallstadt; Bernhard Götz; Elmar Causin, both of Aschaffenburg; Werner-Georg Schroder, Grossotheim, all of Fed. Rep. of Germany

[73] Assignee: Linde Aktiengesellschaft, Wiesbaden, Fed. Rep. of Germany

[21] Appl. No.: 669,231

[22] Filed: Nov. 7, 1984

[30] Foreign Application Priority Data

Nov. 18, 1983 [DE] Fed. Rep. of Germany ....... 3341740

[51] Int. Cl.[4] ............................................ B62D 61/08

[52] U.S. Cl. .................................... 280/781; 280/790

[58] Field of Search ................... 280/781, 107, 405 R, 280/281 R, 790; 180/311

[56] References Cited

U.S. PATENT DOCUMENTS 3,946,824 3/1976 Jester .................................. 280/790

FOREIGN PATENT DOCUMENTS 728202 4/1955 United Kingdom ................ 280/781

*Primary Examiner*—Richard A. Bertsch

*Attorney, Agent, or Firm*—Buell, Ziesenheim, Beck & Alstadt

[57] ABSTRACT

A frame for a scoop loader, fork lift or like vehicle is provided having two lateral carriers whose lower sections are bent to the middle of the vehicle and connected to form a trough like frame that is open upward and adapted to be closed toward its rear by a counterweight connected thereto, a bearing half for supporting a wheel shaft located at the front of each lateral carrier and a pair of mating bearing halves on a separate connector component constituting a front cross piece for the frame and fastener means for connecting the bearing halves to form a complete assembly.

14 Claims, 7 Drawing Figures

FRAMES FOR SCOOP LOADERS, FORK LIFTS AND THE LIKE

This invention relates to frames for scoop loaders, fork lifts and the like and particularly to frames for such apparatus having two lateral carriers whose lower sections are curved in toward the vehicle center and are connected together to form a trough-like frame that is open upward, in which case the frame is closed off by the counterweight connected with the lateral carriers toward the back in the assembled state. The closing off of the frame of a fork lift toward the back by a counterweight is known from the DE-OS No. 26 58 696 wherein a frame consists of two lateral carriers and a front cross piece. In the frame to which the invention refers the two lateral carriers can be connected with each other in the longitudinal median plane of the vehicle, e.g., welded or riveted or bolted or they can consist of a single piece, i.e., of a piece, preferably of bent sheet, that is bent into a broad U-shaped cross section. The outer contour is generally predetermined by the outer shape of the fork lift that is desired for shaping reasons.

The frames of this type known to date either had the disadvantage that they were relatively heavy or they were not sufficiently rigid and that accessibility to the drive elements therein was poor. The frame according to the present invention is preferably used for a scoop loader or the like whose front wheels are supported on an axle drive unit. However, the invention can also be applied to scoop loaders in which each wheel is provided with an individual drive.

The invention proposes a frame that facilitates a high strength at a low material cost through a simple power flow path that is as straight as possible and is cost-favorable and not only facilitates a simple production of the frame, but also a simple assembly of the drive aggregate, both in the production of the scoop loader and in its repair.

This problem is solved in that a bearing box half for the support of a wheel shaft, preferably a wheel axle, in particular an axle drive unit, is located at the front end of each of the two lateral carriers and that the two other bearing box halves are located on a common connector component, which connects the two bearing box halves in a bridge-like or shell-like manner as a cross beam so that in the assembled state this connector component forms a front cross piece for the frame. The frame thus becomes so rigid in the front section that no additional cross pieces are required either in the upper or lower zone.

In a preferred embodiment the bearing boxes are divided in a plane normal to the plane of travel and the connector component is a bridge-like carrier lying in front of the wheel axle. The frame can thus be closed downward in its lower zone up to the region farthest in front and thus form a good closure for preventing noise radiation and at the same time provide protection for the components of the drive aggregate located in the front against the penetration of dirt or bodies such as stones that may be thrown up and cause damage by mechanical impact. If such a front-lying connector component is disassembled, all the driving components can be withdrawn from the frame toward the front. If the drive consists of an axle drive unit in which the wheels are supported and to which the torque conversion transmission and an internal combustion engine are flanged, this entire drive assembly can be built out to the front and the drive assembly can be disassembled with the use of lifting units if the frame is supported (jacked up) and the drive assembly is rolled out on its own wheels and if the rear end of the drive assembly, which is generally made up of the internal combustion engine, is supported, for example, is provided with rollers that can roll on appropriate rails inside of the frame. On the other hand, the frame is open to the top so that there is also a good accessibility from the top and disassembly upward is possible without difficulty.

In another embodiment, the bearing boxes are divided in a plane parallel to the plane of travel and the connector component is a shell-like carrier located under the wheel axis.

It is possible, especially in this embodiment, for the frame to have an opening in the front middle section and for this opening to be covered by a cover plate fastened to the connector component. This cover plate can be connected fast with the connector component, or consist with it of one piece, so that the cover plate is automatically removed if the connector component is detached; however, it can also be removed independently. The front lower section of the drive aggregate is then accessible for servicing through the opening after removal of the cover plate. Especially if the cover plate is connected rigidly with the connector component, it can be expedient if the cover plate is connected in its rear section by a plug connection with the lower frame section, so that the cover plate is also fastened by simple plugging in and fastening the connector component without additional assembly work being required.

In a fork lift there is the additional problem of introducing the forces acting on the lifting stand in the most favorable manner into the frame. It is possible, especially in the embodiment of the connector component as the front carrier, to locate the bearing blocks for the lift stand directly on this connector component. The forces are then introduced into the frame directly through the connector component; they load the axle housing supported in the bearing boxes only with the vertical supporting forces, but not with the horizontal bracing forces, which arise from the fact that the load is absorbed in front of the vertical plane, which passes through the bearing blocks and the lift stand thus must be additionally supported by at least one strut, which is usually designed as a tilting cylinder. On the other hand, it can be provided, preferably in the embodiment in which the connector component is a bearing box attached from the bottom, that each of the two bearing blocks for the lift stand is located on an arm, where each arm is designed as a forward-projecting part of the lateral carrier, which can be formed in the front part of the frame by a wheel box wall.

According to a substantial further step of the invention, it is provided that a bulkhead running crosswise to the direction of travel is located in the middle region of the frame, this bulkhead having a U-shaped opening that is open upward and receives a substantial portion of the cross sectional surface of the frame. Drive aggregates can project through this opening so that they can be installed from above or disassembled upward without difficulty. Additional components such as fuel containers, oil reservoirs, batteries and the like can be located in the corner zones between the bulkhead and the lateral carriers.

A significant further embodiment results from the fact that the bulkhead is formed by a closed hollow section, at least over a substantial part of it. The hollow section can be so large that it exclusively forms the bulkhead. However, it is preferably provided that the hollow section form the inner edge of the bulkhead as a round or preferably rectangular tube.

According to an expedient additional embodiment, it is provided that the tilting cylinder bearing blocks be fastened as tight as possible on the side wall at the bulkhead, so that a favorable introduction of the tilting cylinder force into the frame results. The bulkhead can also form a passage from the lateral carrier in the U-shaped frame region to the wheel box zone.

Through the frame being closed to the sides and below, facilitated by the invention, not only is a high stiffness achieved, but it is also easy to achieve a noise damping from all sides by applying a lid or cover. On the other hand, the drive elements and other noise-producing components can be built well into the frame so that they are vibration-insulated, such that a noise damping is achieved. In particular, the axle housing to which the front wheels are supported can be located in the bearing boxes by means of elastic rings that lie between the bearing boxes and the axle housing, so that no noise vibrations are transferred to the frame here either. The elastic ring can be designed in both its axial and radial cross sections so that it is indeed sufficiently elastic on the one hand and transfers the transverse forces, vertical forces and the forces originating from the torques during driving and braking adequately on the other. The bearing boxes can form an outward-projecting neck that extends far into the wheel rims, so that a favorable support results and which effects only slight bending moments on the axle housing.

A good accessiblity to all the parts that require maintenance results from the fact that the entire frame is open upward. The frame itself consists of relatively few individual components, which are all simple components, preferably components formed of sheet by bending or edging and the frame has relatively few weld joints.

In the foregoing general description, we have set out certain objects, purposes and advantages of this invention. Other objects, purposes and advantages of the invention will be apparent from a consideration of the following description and the accompanying drawings in which FIG. 1 shows a perspective view of a frame with the connector component built on from the front;

FIG. 6 shows a top view of the frame of FIG. 2 with the connector component built on.

Figure 1:
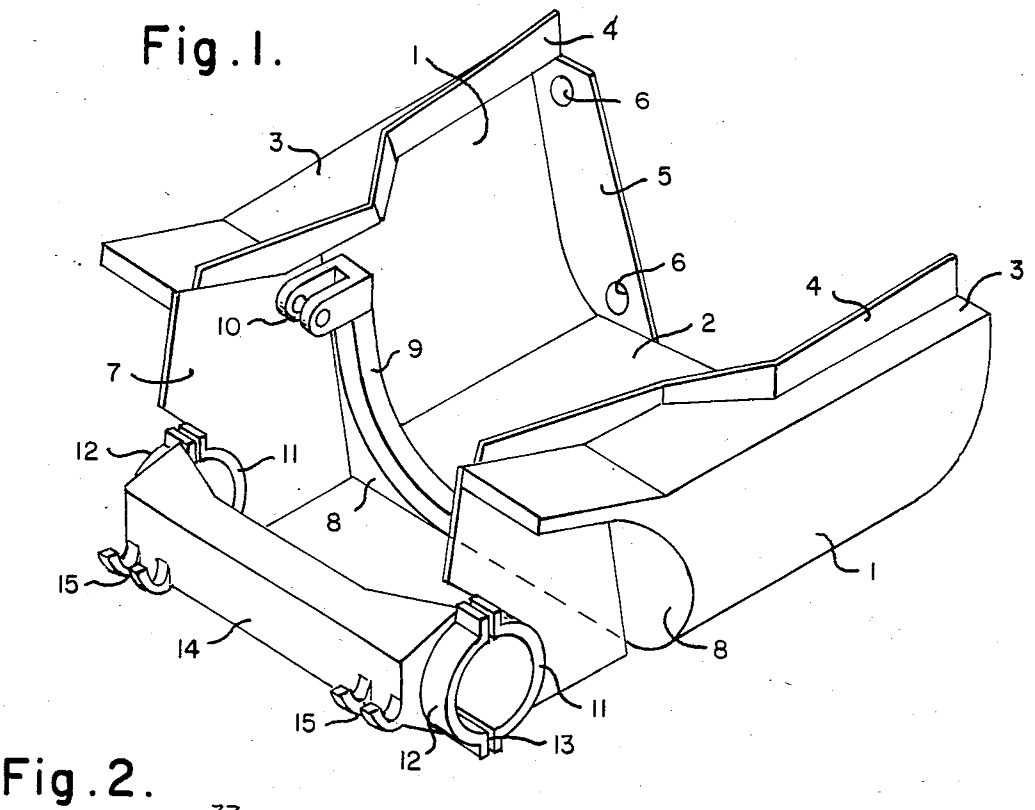

The two lateral carriers 1 consist of one piece with the bottom plate 2 and then are bent so that they form a U-shaped cross section. In the upper zone the horizontal cover surfaces 3 connect to the lateral carriers 1. A vertical cross piece 4 connects to each of the cover surfaces 3; it is provided for strength reasons to increase the rigidity of this U-shaped frame section. In the rear section two connection flanges 5 (only the right-hand one is visible in the drawing) are welded on the piece that forms the lateral carrier 1 and the bottom surface 2; they have holes 6 through which the bolts that connect the counterweight (not shown) with the frame in the assembled state pass. Additional stiffening plates can also be provided to make the connection between the connection flange 5 and the lateral carrier 1 or the cover surface 3 or the strut 4 more rigid and effect a better force transfer, in which case these additional plates are designed so that they render access to the inside of the frame with as little difficulty as possible.

Each of the two lateral carriers 1 extends forward through a lateral carrier 7, which disk-like form the inner boundary of the wheel box. The connection between a lateral carrier 1 and the forward-projecting lateral carrier 7 is formed by a bulkhead 8, which in turn has a broad U-shaped opening upward that makes it possible to install the drive aggregate from the front or from above as desired. A hollow section 9, which is formed of a rectangular tube and gives the bulkhead 8 a substantial stiffening, connects to the edge of the bulkhead 8 that limits the recess in the bulkhead 8. A bearing block for a tilting cylinder (not shown) (only the right-hand one is visible in the drawing) is fastened on each side at the upper end of the bulkhead 8 and the hollow section 9.

A bearing box half 11 is fastened on each of the lateral carriers 7. A bearing box half 12 can be bolted on to it by bolts (not shown in the drawing) so that the plane of separation 13 lies vertical to the plane of travel. The two bearing box halves 12 are connected fast to each other by a connector component carrier 14. Bearing blocks 15 for supporting the lift cylinder are fastened forward, e.g., welded to the connector component carrier 14.

Figure 2:
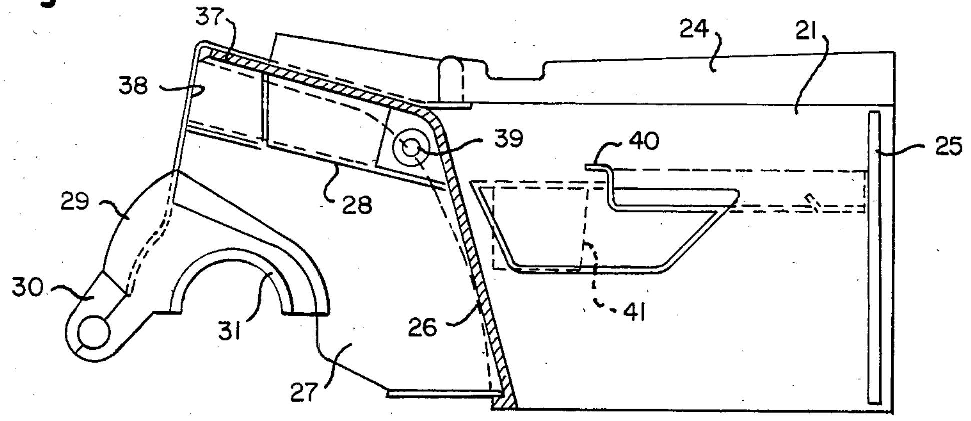
FIG. 2 shows a side view of a frame with the connector component built on from the bottom, cut in a plane parallel to the longitudinal median plane of the vehicle.
Figure 3:
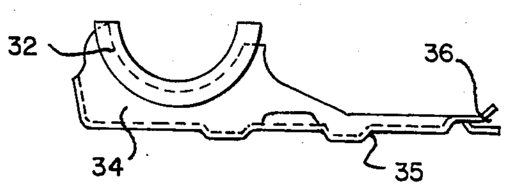
FIG. 3 shows in the same direction of sight a view of the connector component on a larger scale.
Figure 6:
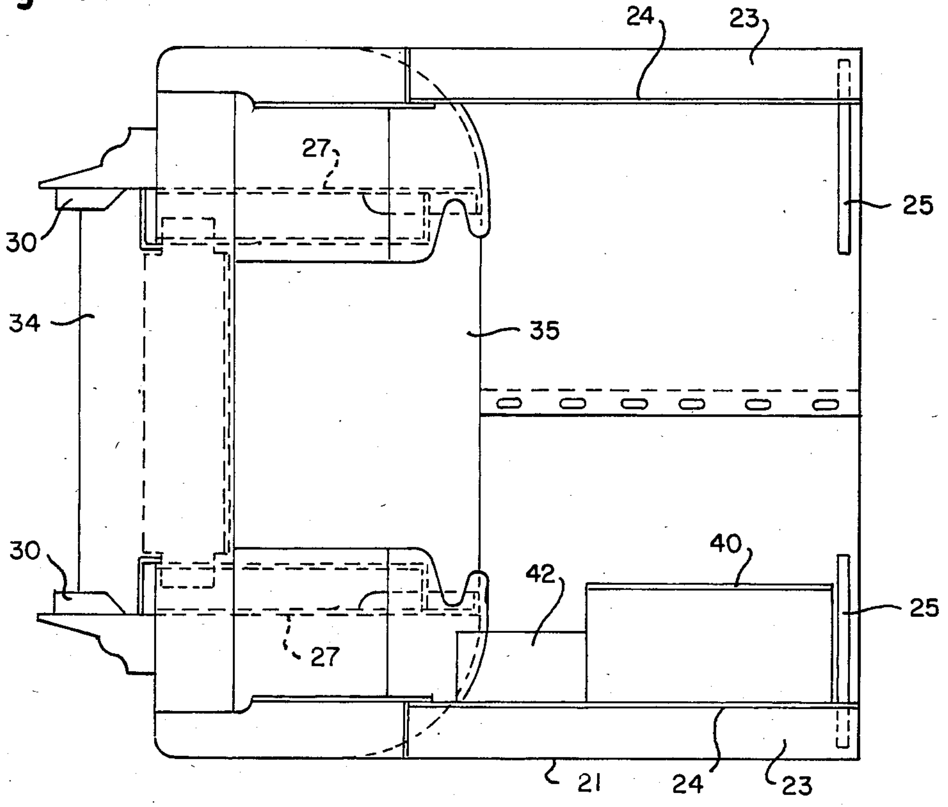
Figure 4:
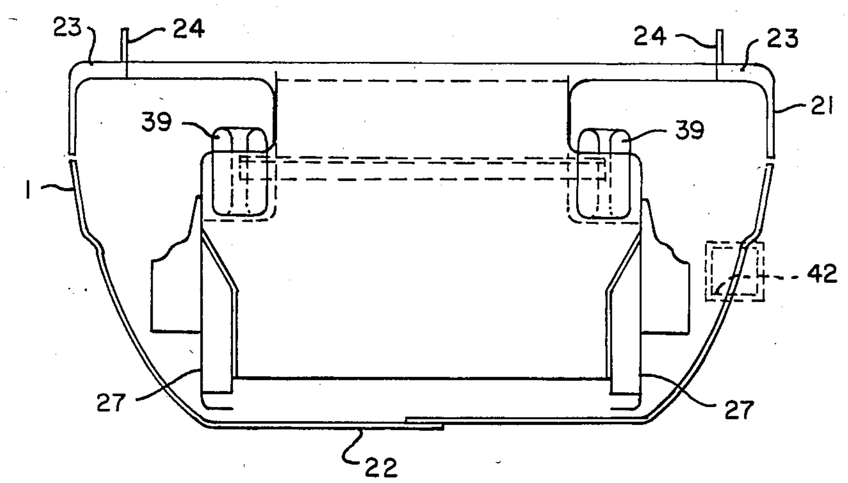
FIG. 4 shows a section through the frame crosswise to the longitudinal median plane of the vehicle of FIG. 2 in its front section with direction of sight toward the back.
Figure 5:
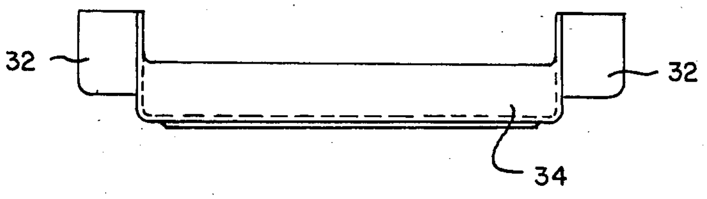
FIG. 5 shows, in the corresponding direction of sight of FIG. 2, the connector component.

In the embodiment shown in FIGS. 2–6 the two lateral carriers 21 essentially correspond to the lateral carriers 1 in FIG. 2. Each of the lateral carriers 21 is bent so that it, consisting of one piece with a half of the bottom plate 22, goes over into it, whereby the two bottom plate halves 22 are connected with each other in the longitudinal median plane of the vehicle in a manner not shown in detail in the drawing. A cover surface 23 connects to each lateral carrier 21 and a strut 24 connects to the latter and a connection flange 25 is connected to the back.

A wheel box is formed on each side by a back plate 26 and wheel box inner walls 27 and an upper plate 28. The upper bearing box half 31 is fastened in the inner wheel box wall 27. The inner wheel box wall 27 continues in an arm 29, to which the bearing block 30 for the tilting cylinder is fastened. The lower bearing box half 32 is formed on a connecting box carrier 34, which continues backward in a cover surface 35, which has a plug socket 36 of a plug connection at its back end.

In the upper front region a cross beam 37 is formed which at the same time is designed as a front wall and is stiffened above by an inner angle 38 in the form of a tube. The bearing blocks 39 for support of the tilting cylinder are also fastened at the inner wheel box walls 27.

40 is a holder for a batter. A recess 41 is provided in the left-hand lateral carrier 21 and in it a lower plate 42 is located, so that this recess 41 can be used with the lower plate 42 as a foot rest for climbing in. The recess 41 is not closed from above; therefore, fresh air can flow at this point from the outside into the inner part of the frame and thus into the engine inner space. Because this fresh air flows close to the battery, the latter is thus cooled.

The forces introduced by the tilting cylinders through the bearing blocks 39 are conveyed through the upper side of the wheel box plate 26 acting as a disk, in the outer skin of the trough formed by the lateral carrier 21 and the bottom plate 22, but also into the front cross beam 37, 38. The upper part of the wheel box inner walls 27 is also designed as a U-shaped carrier and thus contributes substantially to passing the forces on.

In order to increase the stability, the bearing boxes 31, 32 are located as far out as possible and thus project into the wheel rims and engage the axle neck. Forces from exceptional situations, e.g., driving against a curb, are passed on directly into the frame.

Figure 7:
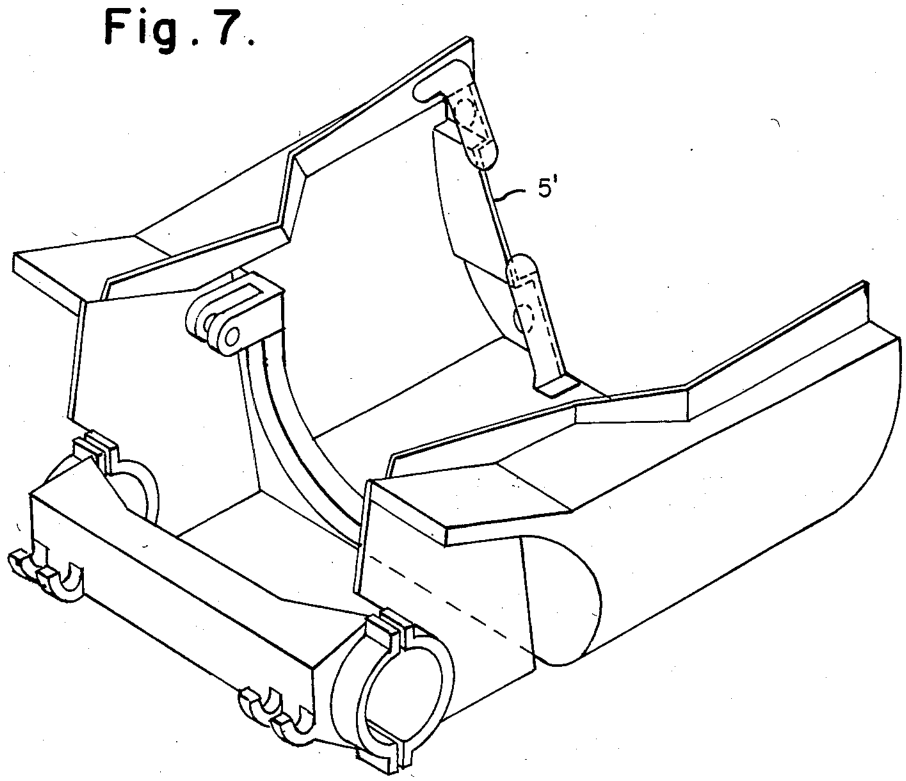
FIG. 7 shows a modified embodiment of a frame according to FIG. 1.

The embodiment according to FIG. 7 differs from that according to FIG. 1 only in that in the embodiment according to FIG. 7 the connector section 5′ that serves to fasten the counterweight is box-shaped. The connection thus becomes rigid and warp resistant with a good conveyance of the forces into the flank chords of the frame.

In the foregoing specification, we have set out certain preferred embodiments and practices of our invention, however, it will be understood that this invention may be otherwise embodied within the scope of the following claims.

We claim:

1. In a frame for a scoop loader, fork lift or the like having two lateral carriers, whose lower sections are bent to the middle of the vehicle and are connected with each other to form a trough-like frame that is open upward and at the front and back, said frame being adapted to be closed toward the back by a counterweight that can be connected with the lateral carriers, the improvement comprising a bearing box half for the support of a wheel shaft located at the front end of each lateral carrier, a pair of mating bearing box halves located on a separate connector component, which constitutes a removable front cross piece for the frame and with the bearing box halves carries a wheel shaft, and means for fastening said connector component to said lateral carriers to form a completed integral rigid but removable assembly.

2. In a frame for a scoop loader, fork lift or the like having two lateral carriers, whose lower sections are bent to the middle of the vehicle and are connected with each other to form a trough-like frame that is open upward, said frame being adapted to be closed toward the back by a counterweight that can be connected with the lateral carriers, the improvement comprising a bearing box half for the support of a wheel shaft located at the front end of each lateral carrier, a pair of mating bearing box halves located on a separate connector component, which constitutes a front cross piece for the frame, and means for fastening said connector component to said lateral carriers to form a completed assembly, wherein the bearing box halves are divided in a plane normal to the plane of travel and the connector component is a carrier lying in front of the wheel axle.

3. Frame according to claim 2, characterized in that the frame is also closed downward in its front section.

4. Frame with at least one bearing block for a lifting mast of a scoop loader or the like according to claim 2, therein at least one bearing block is located on the connector component.

5. In a frame for a scoop loader, fork lift or the like having two lateral carriers, whose lower sections are bent to the middle of the vehicle and are connected with each other to form a trough-like frame that is open upward, said frame being adapted to be closed toward the back by a counterweight that can be connected with the lateral carriers, the improvement comprising a bearing box half for the support of a wheel shaft located at the front end of each lateral carrier, a pair of mating bearing box halves located on a separate connector component, which constitutes a front cross piece for the frame, and means for fastening said connector component to said lateral carriers to form a completed assembly, wherein the bearing box halves are divided in a plane parallel to the plane of travel and the connector component is a carrier located shell-like under the wheel axle.

6. Frame according to claim 2 or 5, wherein the frame has an opening in the front region and said opening is covered by a cover plate fastened to the connector component.

7. Frame according to claim 6, wherein the cover plate has a plug connection section in its rear section for working together with a plug connection section located on the bottom plate.

8. Frame with two bearing blocks for a lifting mast of a scoop loader or the like according to claim 2 or claim 5, wherein the bearing blocks are located on an arm on the front end of the lateral carrier.

9. Frame according to claim 2 or 5, wherein the middle section of the frame has a bulkhead running crosswise to the direction of travel and an opening upward that takes a substantial portion of the cross sectional surface of the frame.

10. Frame according to claim 9, wherein the bulkhead is connected at its inner edge with a closed hollow profile.

11. Frame according to claim 10 wherein the bulkhead is formed by a closed hollow section, at least in a substantial section of it.

12. Frame according to claim 10 characterized wherein bearing blocks for tilting cylinders are fastened on the bulkhead.

13. Frame according to claim 9 wherein the bulkhead is formed by a closed hollow section, at least in a substantial section of it.

14. Frame according to claim 9 characterized wherein bearing blocks for tilting cylinders are fastened on the bulkhead.

* * * * *